No. 668,190. Patented Feb. 19, 1901.
J. G. KING.
BUTTER DISH.
(Application filed Sept. 14, 1900.)
(No Model.) 2 Sheets—Sheet 1.

WITNESSES:
Henry Krug
Russell M. Everett

INVENTOR:
John G. King.
BY
Draket Co.
ATTORNEYS.

No. 668,190. Patented Feb. 19, 1901.
J. G. KING.
BUTTER DISH.
(Application filed Sept. 14, 1900.)
(No Model.) 2 Sheets—Sheet 2.

WITNESSES: INVENTOR:
Henry King John G. King.
Russell M. Everett. BY
Drake & Co.
ATTORNEYS.

UNITED STATES PATENT OFFICE.

JOHN G. KING, OF ORANGE, NEW JERSEY.

BUTTER-DISH.

SPECIFICATION forming part of Letters Patent No. 668,190, dated February 19, 1901.

Application filed September 14, 1900. Serial No. 29,994. (No model.)

*To all whom it may concern:*

Be it known that I, JOHN G. KING, a citizen of the United States, residing at Orange, in the county of Essex and State of New Jersey, have invented certain new and useful Improvements in Butter-Dishes; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The objects of this invention are to provide a refrigerating butter dish or receptacle for the table and more especially for use in restaurants, where the butter must stand continually on the table ready for use; to keep the ice and water from actual contact with the butter, while permitting their cooling effect thereupon; to provide easy and convenient access to the butter, and to secure other advantages and results, some of which may be referred to hereinafter in connection with the description of the working parts.

The invention consists in the improved butter dish or receptacle, and in the arrangements and combinations of parts of the same, all substantially as will be hereinafter set forth and finally embraced in the clauses of the claim.

Figure 1:
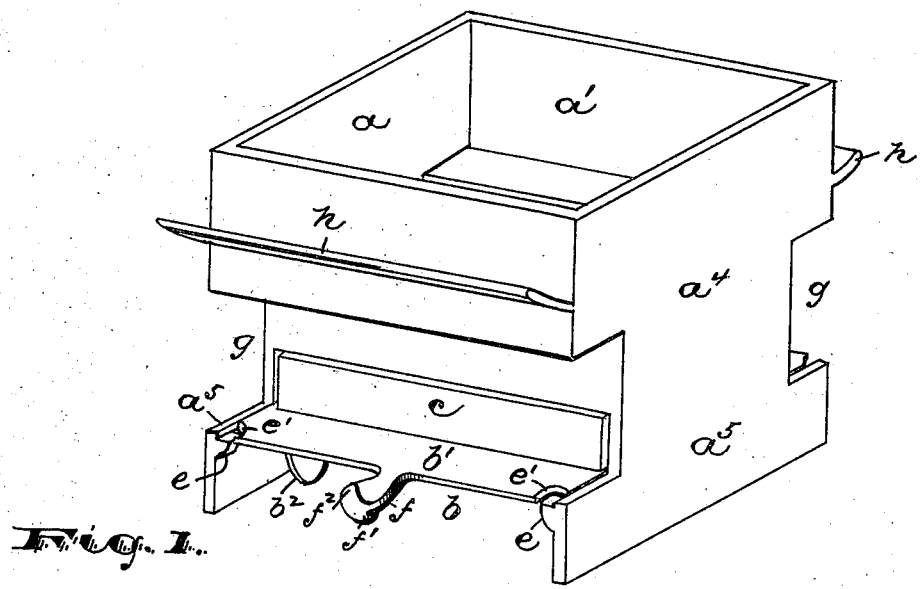
Figures 2, 3:
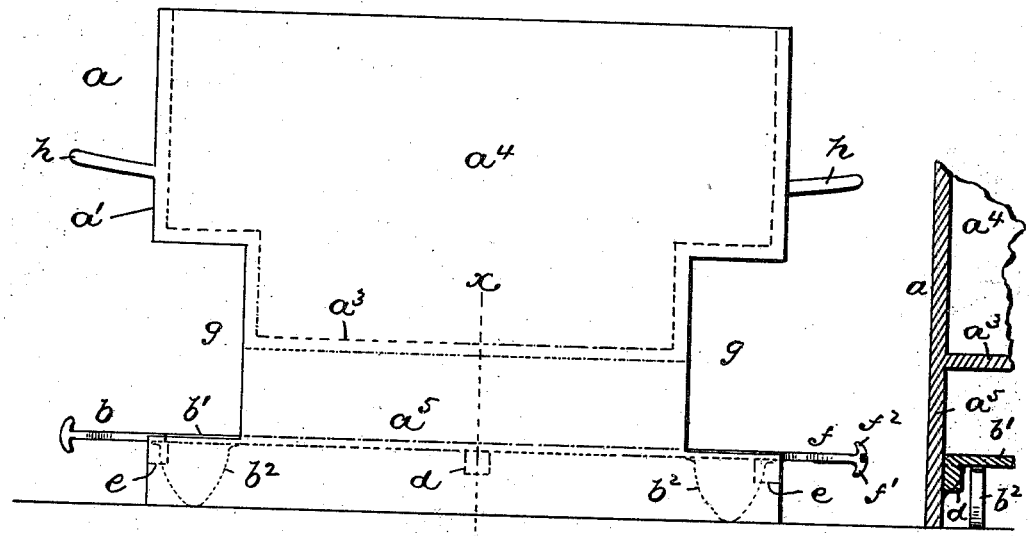
Figures 4, 6:
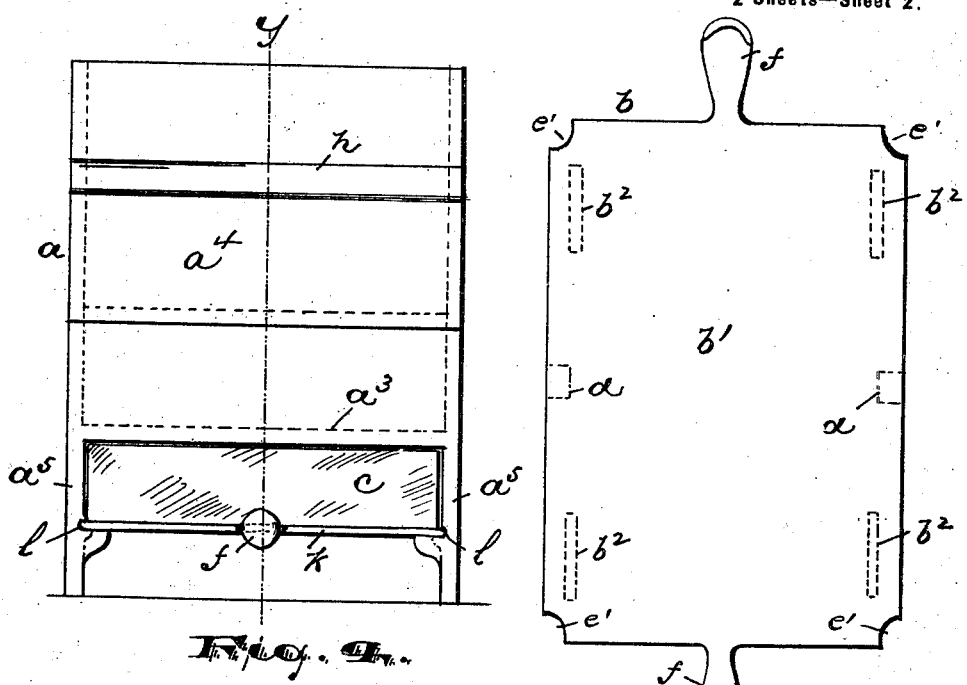
Figure 5:
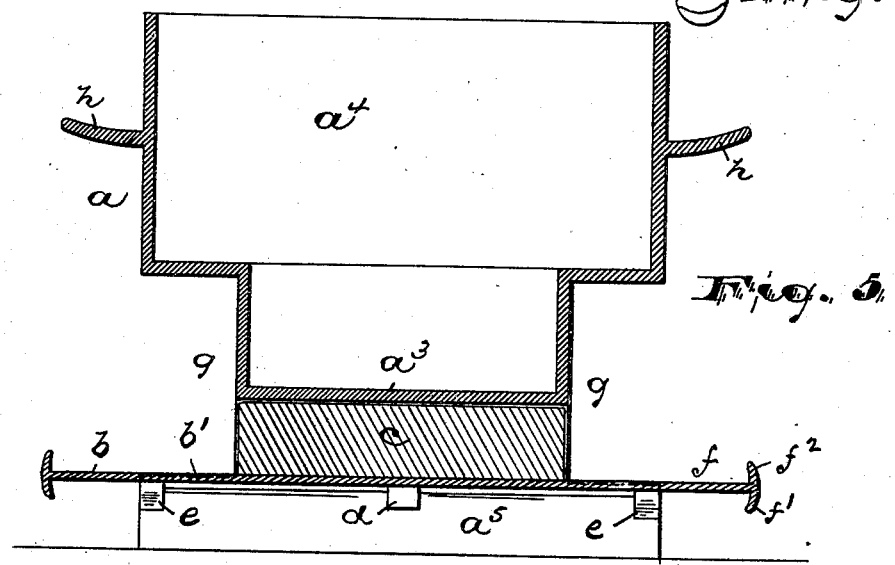

Referring to the accompanying drawings, in which like letters of reference indicate corresponding parts in each of the several views, Figure 1 is a perspective view of my butter-dish, and Fig. 2 is a side elevation. Fig. 3 is a detail cross-section on line $x$, Fig. 2. Fig. 4 is an end elevation of the butter-dish, illustrating a modified form of slide. Fig. 5 is a vertical longitudinal section on line $y$, Fig. 4; and Fig. 6 is a plan of the preferred slide.

In said drawings, $a$ indicates the body portion of my butter-dish, and $b$ a slide separable from said body portion. The entire device is preferably formed of crockery or china in any manner common to the art, although other materials might be used. The body portion $a$ has a box-like upper part $a'$, interiorly hollowed to provide a chamber for cracked ice. A cover (not shown) may be provided for this ice-box, if desired, to prevent too rapid melting of the ice. The bottom of the ice-chamber is closed by a horizontal water-tight floor $a^3$, and the end walls $a^4$ of the ice-box continue downward beyond said floor to form supporting-legs $a^5$ for the body portion. The ice-box $a'$ is thus supported a short distance above the table, and the space beneath is open at the sides of the butter-dish between the legs $a^5$. Through this arch-like open space the slide $b$ is adapted to work, said slide comprising a plate $b'$, preferably having feet $b^2$. Said plate $b'$ occupies a horizontal position and is in length substantially equal to the distance between the legs $a^5$ $a^5$ and of a width about equal to that of the butter-dish. The feet $b^2$ support said plate upon the table independent of the body portion $a$ and at such a height that sufficient space is provided for the butter $c$ to lie upon said plate without striking the bottom $a^3$ of the ice-box. The plate $b$ may be plain at its upper surface, or it may be concaved or provided with a marginal rib to prevent escape of the butter or liquids therefrom.

The two legs $a^5$ of the ice-box being formed by simply extending two opposite end walls of the box down to the table serve, it will be noted, to inclose on two sides the space beneath the box in which the butter-slide operates, the other two sides being necessarily open to permit the slide to pass in and out. The fact that the butter is closed in on two sides, as well as at the top and bottom, largely protects it from currents of air which would otherwise tend to quickly dissipate the cooling influence from the ice-box, and thus the butter is sheltered or inclosed as far as is consistent with any freedom of movement.

In use, therefore, the slide $b$, with the butter thereon, is pushed in directly beneath the ice-box, so that the butter is kept cool and hard by the coolness therefrom, and when it is desired to cut off some butter the slide $b$ is drawn out from beneath the body portion far enough to permit such cutting and then slid back again. Obviously such sliding can take place toward either side of the butter-dish, and to limit the sliding central stops $d\,d$ may be placed on the slide, which will engage cooperating stops $e\,e$ on the body portion at either end of range of movement, and to prevent said stops $e$ from interfering with a free uplifting of the body portion $a$ away from the slide when it is desired to clean or replenish said slide the corners of the plate are cut away or recessed, as at $e'$, to permit the stops $e$ to pass.

Handles $f$ are provided at the ends of the slide $b$, and said handles preferably have at the extremity a downwardly-extending lug $f'$ for the finger and an opposite upwardly-extending lug $f^2$, which can be caught by a knife in the hand of the user to pull out the slide.

In order to enable butter to be cut off without drawing the slide entirely out from under the ice-box, I prefer to recess or undercut the sides of the ice-box at its lower part, as at $g$ $g$, said recesses extending downward to the level of the slide-plate and upward sufficiently far to permit a knife to be employed on the butter beneath the overhanging side of the ice-box. The butter then receives a measure of cooling effect from said overhanging sides even while the slide is pulled out.

Knife rests or supports $h$ are preferably provided on the opposite sides of the ice-box to receive the butter-knife when not in use.

Obviously a slide-plate $k$ might be used under some conditions, which slides at its opposite edges in grooves $l$ in the legs $a^5$ of the body portion; but this construction is not so desirable in that the end of the slide when drawn out to cut off butter is not so firmly supported as it is by the feet $b^2$ in the construction first described.

Having thus described the invention, what I claim as new is—

1. A butter-dish having an ice-box whose walls at two opposite sides of the box are continued downward below the box and form supports holding said ice-box up from the table, and a slide working between said legs beneath the bottom of the ice-box, and adapted to carry the butter, said slide and the butter thereon being shielded on two sides by said wall-like supports and the other two sides being open to permit the butter-slide to pass in or out, substantially as set forth.

2. A butter-dish having an ice-box with two opposite walls extended downward and forming supporting-legs for the box, and an independent butter-slide beneath the ice-box protected on two sides by said supporting-legs and adapted to be slid out at either of the open sides, the ice-box being horizontally recessed or undercut at its lower edges on the open sides whereby access to the butter is had without drawing the slide wholly out from beneath the ice-box, substantially as set forth.

3. In a butter-dish, the combination of a water-tight box or receptacle for cracked ice, and legs supporting said box above the table, and a slide working horizontally beneath said ice-box independent thereof, said slide having feet on its under side and being adapted to carry the butter on its upper surface, substantially as set forth.

4. In a butter-dish, the combination of the ice-box $a'$, having legs at its opposite ends and providing an open passage beneath from side to side, and a slide comprising a plate adapted to carry the butter on its upper surface and having feet supporting said plate independent of the ice-box, substantially as set forth.

5. The combination of the body portion $a$, providing an ice-box at the top and an open passage-way from side to side beneath said ice-box, and a slide working back and forth in said passage-way and carrying the butter, and stops limiting the movements of said slide, substantially as set forth.

6. The combination of the body portion $a$, having an ice-box at the top and supporting-legs beneath formed by extending the ends downward, said body portion being longitudinally recessed or cut away along its sides and the recess cutting into the lower part of the ice-box and upper part of the legs, and a horizontal slide working beneath the ice-box at about the bottom of said recesses, substantially as set forth.

7. The combination with the body portion $a$, having an upper ice-box and an open passage beneath from side to side, of a horizontal slide adapted to reciprocate in said passage and having handles at its ends, said handles being each provided at its extremity with upwardly and downwardly extending lugs providing a finger-hold, substantially as set forth.

In testimony that I claim the foregoing I have hereunto set my hand this 23d day of August, 1900.

JOHN G. KING.

Witnesses:
 CHARLES H. PELL,
 RUSSELL M. EVERETT.